United States Patent [19]

Pearson

[11] 4,241,890
[45] Dec. 30, 1980

[54] AERIAL DELIVERY SYSTEM

[75] Inventor: Raymond E. Pearson, Redmond, Wash.

[73] Assignee: The Boeing Company, Seattle, Wash.

[21] Appl. No.: 92,146

[22] Filed: Nov. 7, 1979

Related U.S. Application Data

[63] Continuation of Ser. No. 961,359, Nov. 16, 1978, abandoned.

[51] Int. Cl.³ .............................................. B64D 9/00
[52] U.S. Cl. .................................. 244/137 R; 410/92
[58] Field of Search ............ 244/118.1, 118.2, 137 R, 244/138 R; 410/79, 84, 85, 89, 92, 105

[56] References Cited

U.S. PATENT DOCUMENTS

| | | | |
|---|---|---|---|
| 3,182,608 | 5/1965 | Mollon | 244/137 R |
| 3,335,983 | 8/1967 | Mollon et al. | 244/137 R |
| 3,401,905 | 9/1968 | Rohrlick | 244/137 R |
| 3,424,410 | 1/1969 | Galaup | 244/137 R |

FOREIGN PATENT DOCUMENTS 1234282  10/1960  France .................................. 244/137 R

*Primary Examiner*—Charles E. Frankfort
*Attorney, Agent, or Firm*—Thomas H. Murray

[57] ABSTRACT

An aircraft aerial cargo delivery system for aircraft having a rear cargo receiving and delivery opening and ramp. Cargo is ordinarily secured to pallets which move backwardly and out of the rear cargo delivery opening under either the pull of a parachute when the aircraft is airborne or under the influence of rapid acceleration of the aircraft during a rapid (i.e., combat off-load) discharge of the cargo onto the ground. Locks must be provided (1) which will positively retract (unlock) for ground loading of pallets, (2) which will secure the pallets against forward or aft movement during normal flight conditions, (3) which will permit free aft movement but not forward movement only during combat off-load conditions, and (4) which will permit, through the use of a metallic fuse, aft movement only after a parachute connected to the pallet opens and exerts a predetermined force on the pallet sufficient to overcome the resistance presented by the fuse. The present invention provides locks for the pallets which combine all of the foregoing functions, which can be incorporated into one of two restraint rails on which the pallets are positioned, and which can be controlled by a single control rod at the load master station of the aircraft.

14 Claims, 12 Drawing Figures

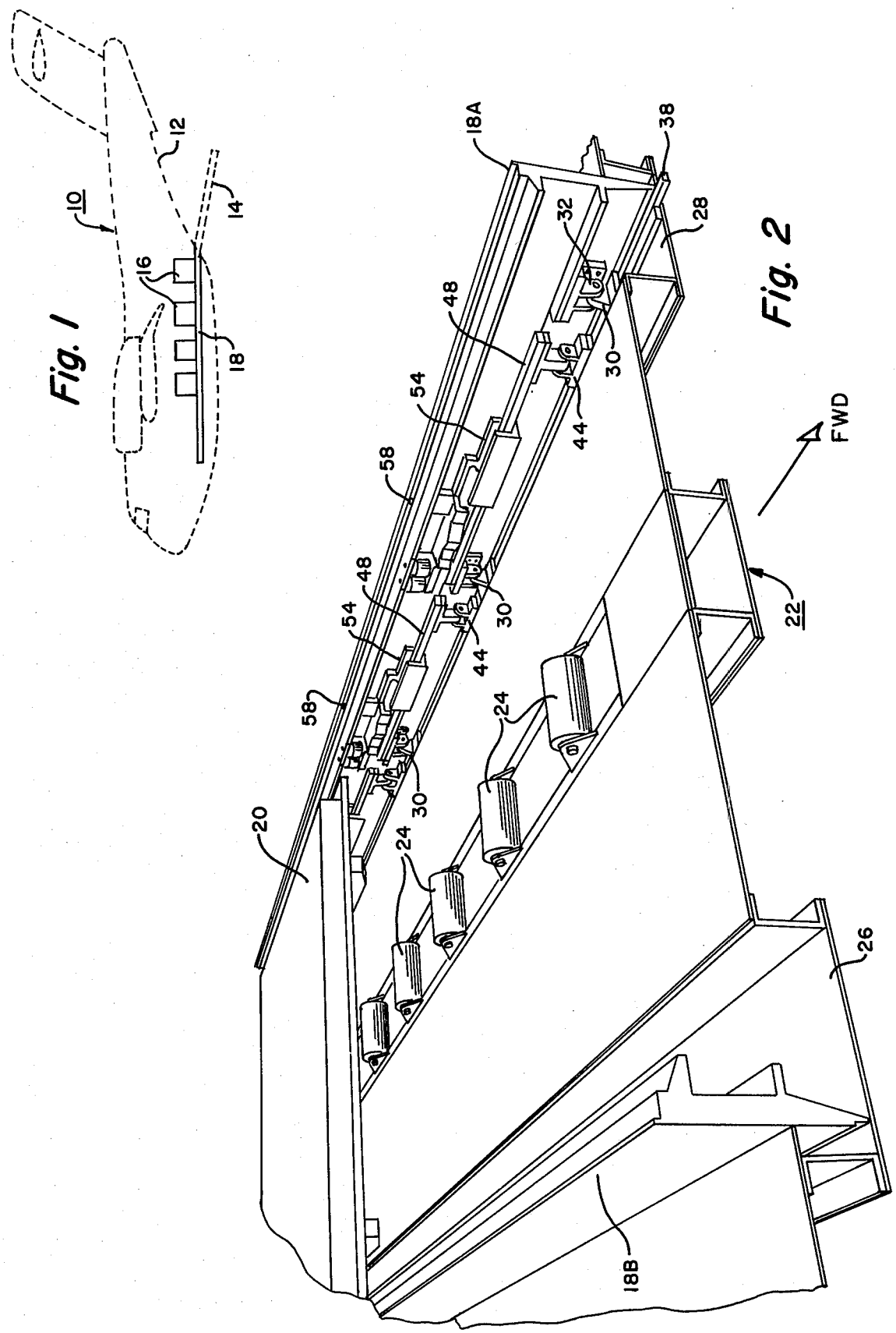

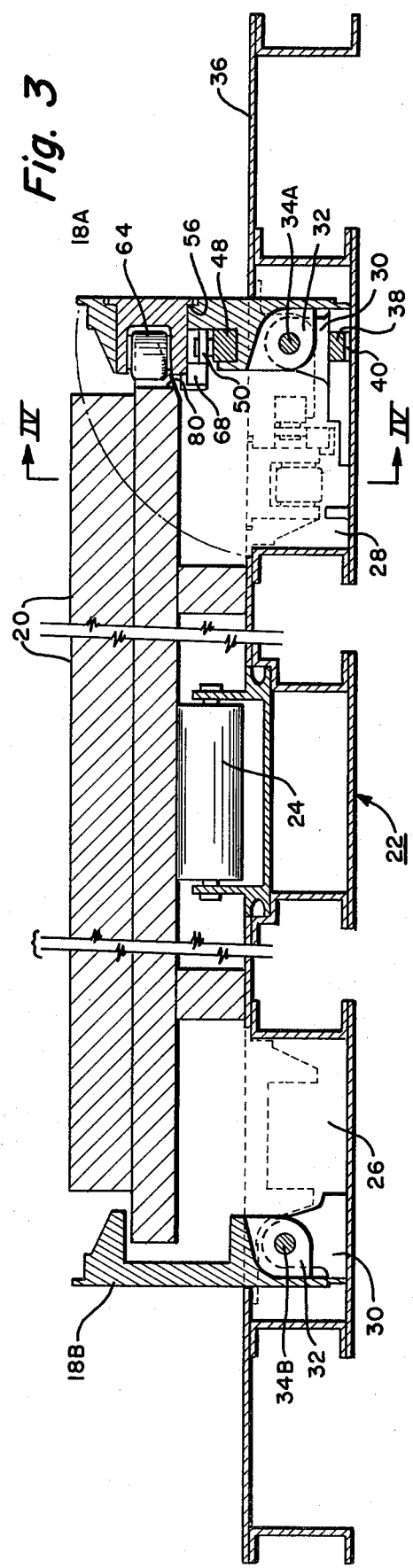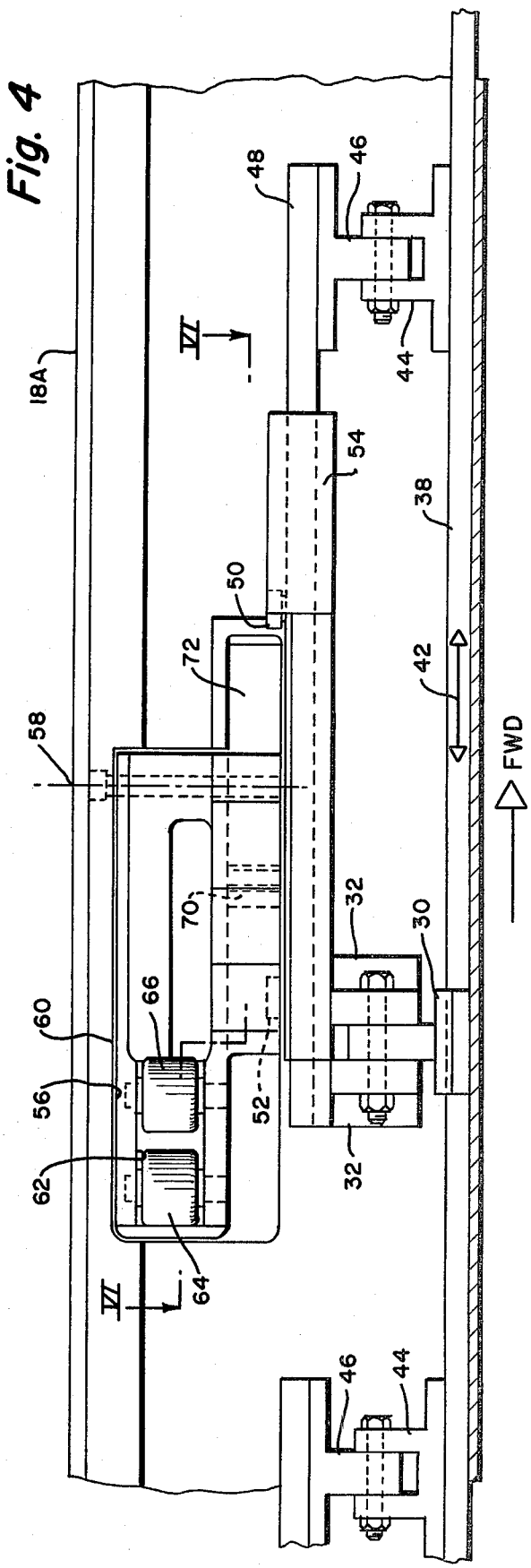

FWD ◁——                              ——▷ AFT

AERIAL DELIVERY SYSTEM

This is a continuation of application Ser. No. 961,359, filed Nov. 16, 1978, now abandoned.

BACKGROUND OF THE INVENTION

As is known, cargo drops by parachute from aircraft have been extensively employed in military operations and disaster relief situations. In the usual parachute cargo delivery system, loaded platforms are guided for movement along the longitudinal axis of the aircraft between parallel rails secured to the aircraft floor. They can be pulled backwardly out of a rear cargo receiving and delivery opening by means of a parachute. Desirably, such cargo planes must also be capable of discharging cargo onto the ground as the aircraft accelerates over the ground surface.

In certain prior art aerial cargo delivery systems of this type, one of the two restraint rails which guide the cargo pallets are provided with aerial delivery system locks (i.e., those which permit only aft movement of a pallet under the force exerted by a parachute). The logistic locks (i.e., those which prevent both forward and aft movement during normal flight conditions) are carried on the other rail. In the aerial delivery mode, the logistic locks on the left rail, for example, are all disengaged while the aerial delivery locks on the right rail provide all forward and aft restraint. If it is necessary to return to the logistically locked position, the locks on the left rail must be manually reengaged. However, the pallets may shift slightly while the logistic locks are disengaged, resulting in a skewed condition of the pallets on the rails. This makes reengagement by the logistic locks very difficult due to slot misalignment. Furthermore, prior art systems wherein locks are deployed on both rails are heavy, complex and generally unreliable.

SUMMARY OF THE INVENTION

In accordance with the present invention, the disadvantages of prior art lock systems for airborne cargo pallets are obviated by combining the aerial delivery system and logistic lock functions into one set of locks carried on one guide rail and controlled by a single control rod at a load master station. By incorporating both lock functions into one lock for each pallet and placing the lock on the left-hand rail, for example, the lock never has to disengage from the load unless the cargo is actually unloaded. This eliminates the necessity of moving pallets which may have skewed to reengage the logistic lock function.

Further, in accordance with the invention, a bending fuse is employed, designed to operate in the aerial delivery system mode, which will retain a pallet in its proper position until a maximum, predetermined load is applied to the pallet by an extended parachute. At this moment, the fuse fails in bending, allowing the pallet to be dragged out of the rear cargo delivery opening by the parachute. The failure point of the fuse is dependent upon the rupture characteristics of the metal used to fabricate the fuse. By properly choosing the material, fuses of varying tolerances may be employed.

The above and other objects and features of the invention will become apparent from the following detailed description taken in connection with the accompanying drawings which form a part of this specification, and in which:

FIG. 1 is a schematic illustration of a cargo plane with which the present invention may be utilized;

FIG. 2 is a perspective view of the locking mechanism of the invention showing its location on one of two restraint rails for pallets loaded onto an aircraft;

FIG. 3 is a cross-sectional end view of the apparatus shown in FIG. 2;

FIG. 4 is a cross-sectional view taken substantially along line IV—IV of FIG. 3;

Figure 6E:
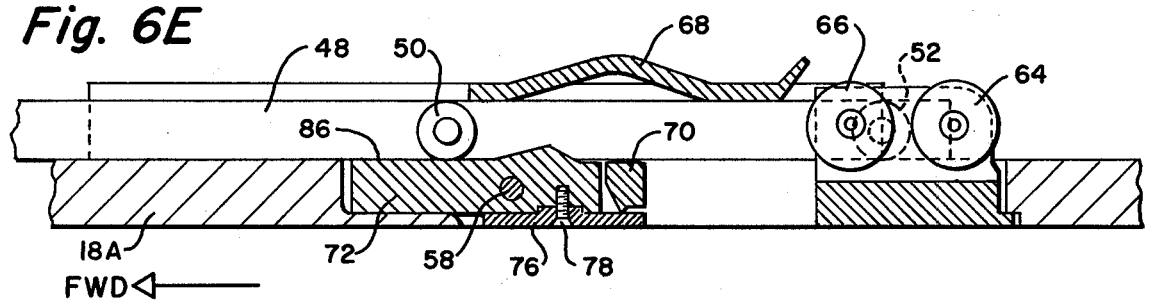
FIGS. 6A–6F, taken substantially along line VI—VI of FIG. 4, show various positions of the rotatable locking mechanism of the invention.

With reference now to the drawings, and particularly to FIG. 1, a cargo plane is shown schematically and identified generally by the reference numeral 10. It is provided on its underside with a rear cargo receiving and delivery opening 12 and ramp 14. Cargo within the aircraft 10 is identified by the reference numeral 16 and is carried on pallets which are adapted to travel backwardly on restraining guideways or tracks generally indicated by the reference numeral 18. Cargo can be discharged from the aircraft with the ramp 14 in the open position by causing a parachute, attached to the cargo on each pallet, to be released into the slip stream below and behind the aircraft. Before the parachute is dereefed and expanded to its full drag and load suspension area, the cargo on each pallet should be restrained and prevented from movement. However, once the full drag force of the parachute is exerted on the cargo, it should "break away" from the guide rails 18 such that it can move backwardly through the opening 12. This mode of operation is referred to as the aerial delivery mode.

On the other hand, it is sometimes desirable or necessary to unload the cargo on the pallets while the aircraft is taxiing on the ground and accelerating. In this mode, called the combat off-load mode, the pallets are restrained against forward movement but must be free to move aft of the aircraft. In still another mode of operation, referred to as the logistically locked mode, the pallets are locked to the guide rails 18 during normal flight of the aircraft and can move neither forward nor aft.

In FIGS. 2 and 3, a typical pallet is identified by the reference numeral 20 while the guide rails are identified by the reference numerals 18A and 18B. Guide rail 18A will be referred to as the left-hand guide rail while guide rail 18B will be referred to as the right-hand guide rail. The two guide rails 18A and 18B are interconnected by an aircraft floor structure 22 provided with rollers 24 on which the pallets 20 can move. Formed in the floor structure 22 are two troughs 26 and 28 each having a plurality of upstanding brackets 30 spaced along its length (see FIGS. 3 and 4). The brackets 30, in turn, are connected through a hinge connection to brackets 32 on the guide rails 18A and 18B, the arrangement being such that the guide rail 18A, for example, can pivot about axis 34A (FIG. 3) from the upright position shown to the horizontal dotted-line position shown wherein its top surface is essentially flush with the upper surface 36 of the floor structure 22. Similarly, the guide rail 18B can rotate about axis 34B from the upright position shown in FIG. 3, for example, to the dotted-line position where it is also flush with the floor surface 36. As will be appreciated, when the aircraft is carrying no palletized cargo, the rails 18A and 18B will be rotated downwardly into the horizontal dotted-line positions so as to eliminate any discontinuities in the floor surface.

Extending along the entire length of the guide rail 18A, at the bottom thereof (FIGS. 3 and 4) is an actuator bar 38 which extends through openings 40 (FIG. 3) in the brackets 30. In this manner, it will be appreciated that the actuator bar 38 can slide backwardly or forwardly along the direction of arrow 42 shown in FIG. 4. Carried on the bar 38, and slidable therewith, are brackets 44 (FIG. 4) pivotally connected to brackets 46. Each of the brackets 46, in turn, is secured to an associated slidable bar 48 which carries two cam rollers 50 and 52. Each of the bars 48 is slidable within and is supported on a generally U-shaped bracket 54 formed on the inside surface of the guide rail 18A. The pivotal axis of the brackets 30, 32 is aligned with that of brackets 44, 46 such that the bars 48 and the cams 50, 52 carried thereby will rotate downwardly into trough 28 when rail 18A is rotated into the broken-line position shown in FIG. 3.

Figure 5A:
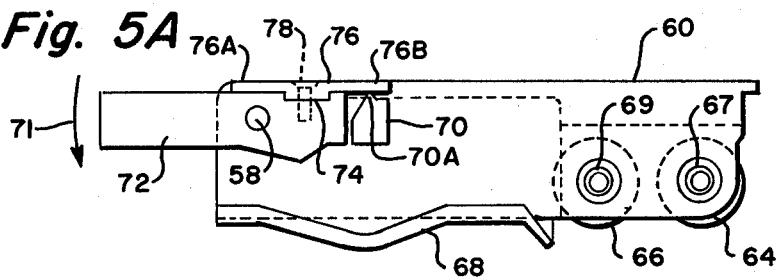
FIGS. 5A and 5B are bottom and side views, respectively, of the rotatable locking mechanism of the invention.
Figure 5B:
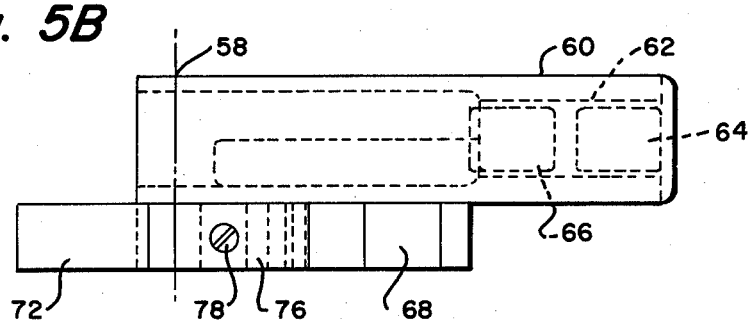

The guide rail 18A is provided along its length with a series of openings 56. Only one of such openings is shown in FIG. 4; however, it should be understood that the openings 56 are spaced apart on rail 18A such that at least two of the openings are adjacent each of the respective pallets. Pivotally carried within each of the openings 56, about an axis 58, is a locking mechanism, the details of which are shown in FIGS. 5A and 5B. FIG. 5A is a bottom view of the locking mechanism; whereas FIG. 5B is a view of the locking mechanism from the side opposite that of FIG. 4.

The locking mechanism includes an upper body portion 60 having a horizontal slot 62 (see also FIG. 4) which carries a pair of rollers 64 and 66 rotatable about axes 67 and 69, respectively. Projecting downwardly from the bottom of the body portion 60 is a vertical cam surface 68 on one side of the body portion 60 and a downwardly-depending projection 70 on the other side of the body portion. Also carried beneath the body portion 60 is an elongated member 72 pivotal about the axis 58. The member 72 is provided with a slot 74; and fitted into the slot 74 is a generally T-shaped fuse member 76 secured in place by means of screw 78. The fuse member 76 has a portion 76A which overlies the body of member 72 so as to rotate therewith and a portion 76B which extends beyond the member 72 and is in engagement with a knife-edge 70A on the projection 70. Member 72 is not connected to body portion 60 and can rotate about axis 58 with respect to body portion 60 in the direction of arrow 71 (FIG. 5A) assuming that the turning force is great enough to cause portion 76B to bend outwardly against knife-edge 70A. As shown in FIG. 3, the rollers 64 and 66 are adapted to fit into slots or notches 80 formed in flanges on the pallets 20.

Figure 6F:
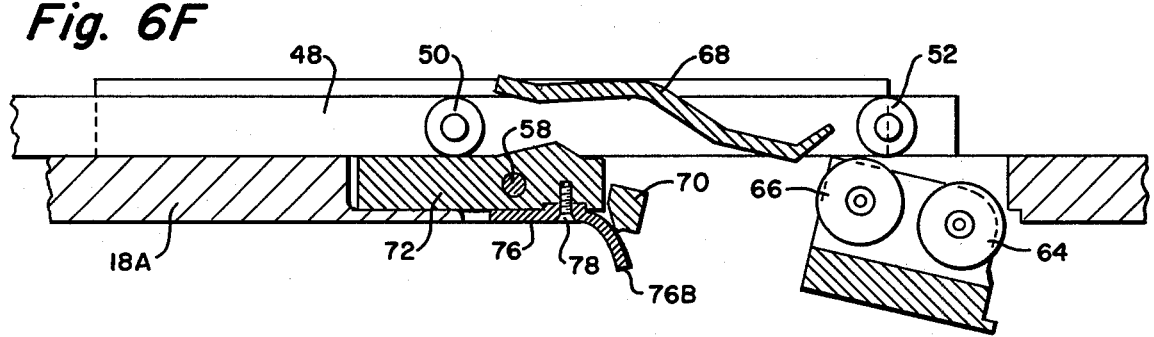
Figure 6A:
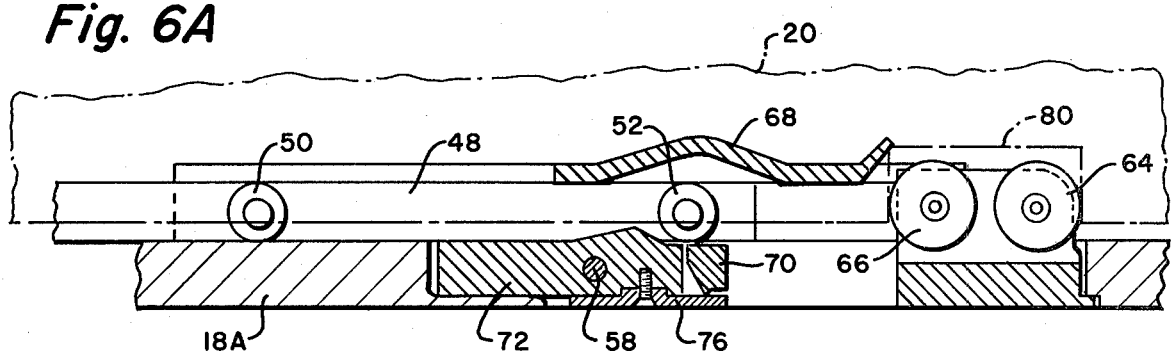
Figure 6B:
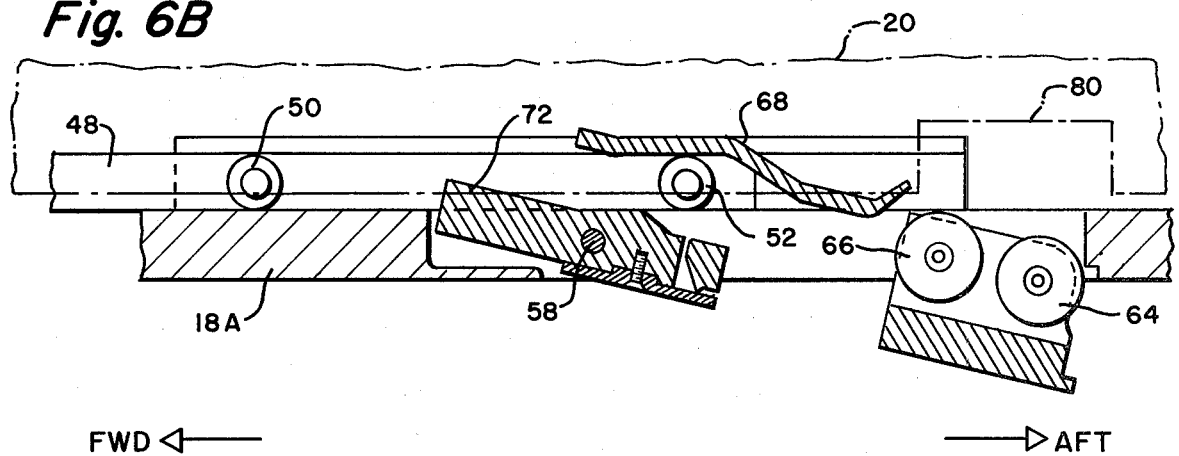
Figure 6C:
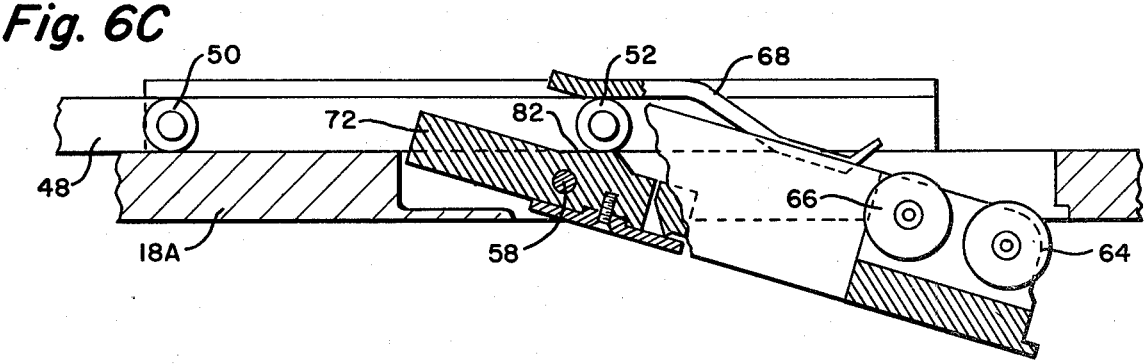

The operation of the locking mechanism can best be understood by reference to FIGS. 6A–6F. In FIGS. 6A and 6B, the position of the actuating bar 38 and cam rollers 50 and 52 is shown for the combat off-load and unlocked positions, respectively. Upon aft movement of a pallet 20 (i.e., to the right in FIG. 6A), the rollers 64 and 66 will be forced out of slot 80 in the pallet 20 with the entire locking mechanism being caused to rotate in a clockwise direction about the axis 58 and into the position shown in FIG. 6B. Should the pallet attempt to move forward, however, roller 64 will attempt to rotate in a counterclockwise direction as viewed in FIG. 6A. This tends to rotate the locking mechanism about axis 58 in a counterclockwise direction also, holding it in the locked position. Thus, under these conditions, the pallets can move aft but not forward. In FIG. 6B, the lock is shown in its unlocked position. After the pallets are loaded onto the rollers 24 and the notches 80 aligned with rollers 64 and 66 on the respective locking mechanisms, each locking mechanism may be simply kicked so as to rotate it about its axis 58 in a counterclockwise direction whereby the rollers 64 and 66 will be moved back into an associated notch 80 in a pallet 20. However, by moving the actuating bar 38 and the cam rollers 50 and 52 forward so that roller 52 engages cam surface 82 on member 72, it will be appreciated that the locking assembly is prevented from moving about axis 58 from its open position and into the locked position. This condition is shown in FIG. 6C.

Figure 6D:
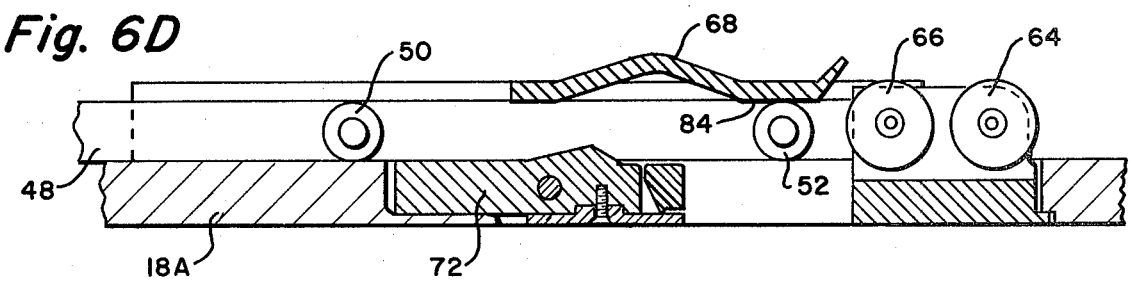

In FIG. 6D, the actuating rod 38 and cam rollers 50 and 52 are shown in the logistically locked position. In this position, roller 52 engages cam surface 84 and the lock mechanism cannot move in a clockwise direction about axis 58 with the result that the rollers 64 and 66 must remain within a notch 80 in a pallet 20. FIG. 6D thus shows the positions of the cam rollers 50 and 52 during normal flight, under which conditions the pallets can move neither forward nor aft.

In FIG. 6E, the cam rollers 50 and 52 are moved to their extreme rearward positions. Roller 50 now engages surface 86 on member 72. Under these circumstances, member 72 is blocked against rotation; however the upper body portion 60, including lower elements 64, 66 and 68, can still rotate about the axis 58, assuming that enough force is applied to it to bend the fuse 76 as shown in FIG. 6F. This will occur, for example, when a parachute to which cargo on a pallet is attached is deployed to the rear of the aircraft and opens. The force exerted on the pallet, which will be approximately 5,000 to 55,000 pounds, depending on parachute size, will force the rollers 64 and 66 out of their associated slot 80 in a pallet. Roller 64 will rotate in a clockwise direction as the pallet moves backwardly, causing clockwise rotation of the lock mechanism (but not member 72) about axis 58. At the same time, the portion 76B of the fuse 76 will bend outwardly as shown in FIG. 6F. This releases the pallet in order that it can be dragged out of the rear opening in the aircraft under the force of the parachute. At the same time, the fuse 76 is of sufficient strength to prevent aft movement of the pallet under nominal flight conditions. It will be appreciated, of course, that once a pallet has ejected from the rear of the aircraft with the use of a parachute, the fuse 76 must be replaced by a new fuse. This can be accomplished by simply loosening the screw 78, removing the bent fuse, inserting a new fuse, and tightening the screw 78. Fuses of several different load ratings are used to accommodate the various parachute forces.

It can thus be seen that the present invention provides a means whereby logistic locking, combat off-load release and aerial delivery via a parachute can be provided by locks at only one side of each pallet. Although the invention has been shown in connection with a certain specific embodiment, it will be readily apparent to those skilled in the art that various changes in form and arrangement of parts may be made without departing from the spirit and scope of the invention.

I claim as my invention:

1. An aerial cargo delivery system comprising a pair of parallel guide rails for cargo-carrying pallets extending longitudinally along the floor of an aircraft which has a rear cargo receiving and delivery opening, a single one of said rails at spaced points therealong being provided with pallet locking mechanisms each of which is provided with means for releasably engaging a pallet to hold it in position along the guide rails, and cam means for each of said locking mechanisms simultaneously movable along said single rail, said cam means having a first position where said engaging means will release said pallet for movement aft of the aircraft but not forward of the aircraft, a second position where said engaging means will prevent either forward or aft movement of a pallet and a third position where the engaging means will prevent forward movement of a pallet but will permit aft movement of the pallet by movement of said engaging means into a release position against the restraining force of a deformable metallic fuse.

2. The system of claim 1 wherein said cam means are movable to a fourth position where said engaging means can release said pallet for movement either forward or aft of the aircraft.

3. The system of claim 1 wherein each of said pallet locking mechanisms comprises a first member which is rotatable at its one end about an axis extending perpendicular to the floor of the aircraft and wherein the means for releasably engaging a pallet to hold it in position comprises roller means insertable into a notch formed in the side of the pallet.

4. The system of claim 3 wherein the roller means comprises a pair of rollers spaced along said single rail and rotatable about axes extending perpendicular to said floor, one of said rollers engaging one edge of a notch in a pallet and the other roller engaging the other edge of said notch.

5. The system of claim 4 wherein said cam means is adapted to engage a cam surface on said rotatable first member to prevent rotation of the first member from its position where it is flush with the side of the rail to prevent either forward or aft movement of a pallet.

6. The system of claim 4 wherein the pallet locking mechanism further includes a second member rotatable about said axis which is perpendicular to the floor of the aircraft, said second member normally being prevented from rotating with respect to the first rotatable member by said metallic fuse, the cam means being adapted to engage said second member and permit rotation of the first member with respect to the second member only by overcoming the restraining force of the fuse.

7. The system of claim 6 wherein said metallic fuse comprises a metallic strip secured to said second member and extending over a portion of said first member to normally prevent rotation of one member with respect to the other.

8. The system of claim 3 wherein said rotatable first member rotates from a position where it is flush with a side of said single rail to a position rotated outwardly from the side of the single rail, the roller means extending into said notch in the side of a pallet when said first member is flush with the side of the rail.

9. The system of claim 1 including an actuating bar extending along said single one of said rails for simultaneously imparting linear movement to the cam means for each locking mechanism.

10. The system of claim 1 including troughs formed in said floor of the aircraft, and means mounting said guide rails for pivotal movement from positions where they extend upwardly from the floor to positions where they are rotated downwardly into the troughs and form a flush surface with the remainder of the aircraft floor.

11. An aerial cargo delivery system comprising a pair of parallel guide rails for cargo-carrying pallets extending longitudinally along the floor of an aircraft which has a rear cargo receiving and delivery opening, a single one of said rails at spaced points therealong being provided with pallet locking mechanisms adapted to restrain a pallet against both forward and aft movement, each of said locking mechanisms being provided with means for releasably engaging a pallet to hold it in position along the guide rails, and cam means for controlling each of said locking mechanisms, said cam means having a first position where said engaging means will prevent either forward or aft movement of a pallet and a second position where the engaging means will prevent forward movement of a pallet but can permit aft movement of the pallet by movement of said engaging means into a release position against the restraining force of a deformable fuse.

12. The system of claim 11 wherein said cam means are movable to a third position where said engaging means can release said pallet for movement either forward or aft of the aircraft.

13. The aerial cargo delivery system of claim 11 wherein said parallel guide rails are mounted on hinges and are rotatable from a first position where they project upwardly from the floor of the aircraft to a second position where they are flush with the floor of the aircraft.

14. An aerial cargo delivery system comprising a pair of parallel guide rails for cargo-carrying pallets extending longitudinally along the floor of an aircraft which has a rear cargo receiving and delivery opening, a single one of said rails at spaced points therealong being provided with pallet locking mechanisms adapted to restrain a pallet against both forward and aft movement, each of said locking mechanisms being provided with means for releasably engaging a pallet to hold it in position along the guide rails, actuating bar means for the locking mechanisms reciprocable along a path of travel extending parallel to said single rail, and cam means on said actuating bar means for each locking mechanism, the respective cam means being simultaneously movable parallel to said single rail as said actuating bar means reciprocates, said cam means each having a first position where said engaging means will prevent either forward or aft movement of a pallet, a second position where the engaging means will prevent forward movement of a pallet but can permit aft movement of the pallet by movement of said engaging means into a release position against the restraining force of a deformable fuse, and a third position where said engaging means can release said pallet for movement either forward or aft of the aircraft.

* * * * *